UNITED STATES PATENT OFFICE.

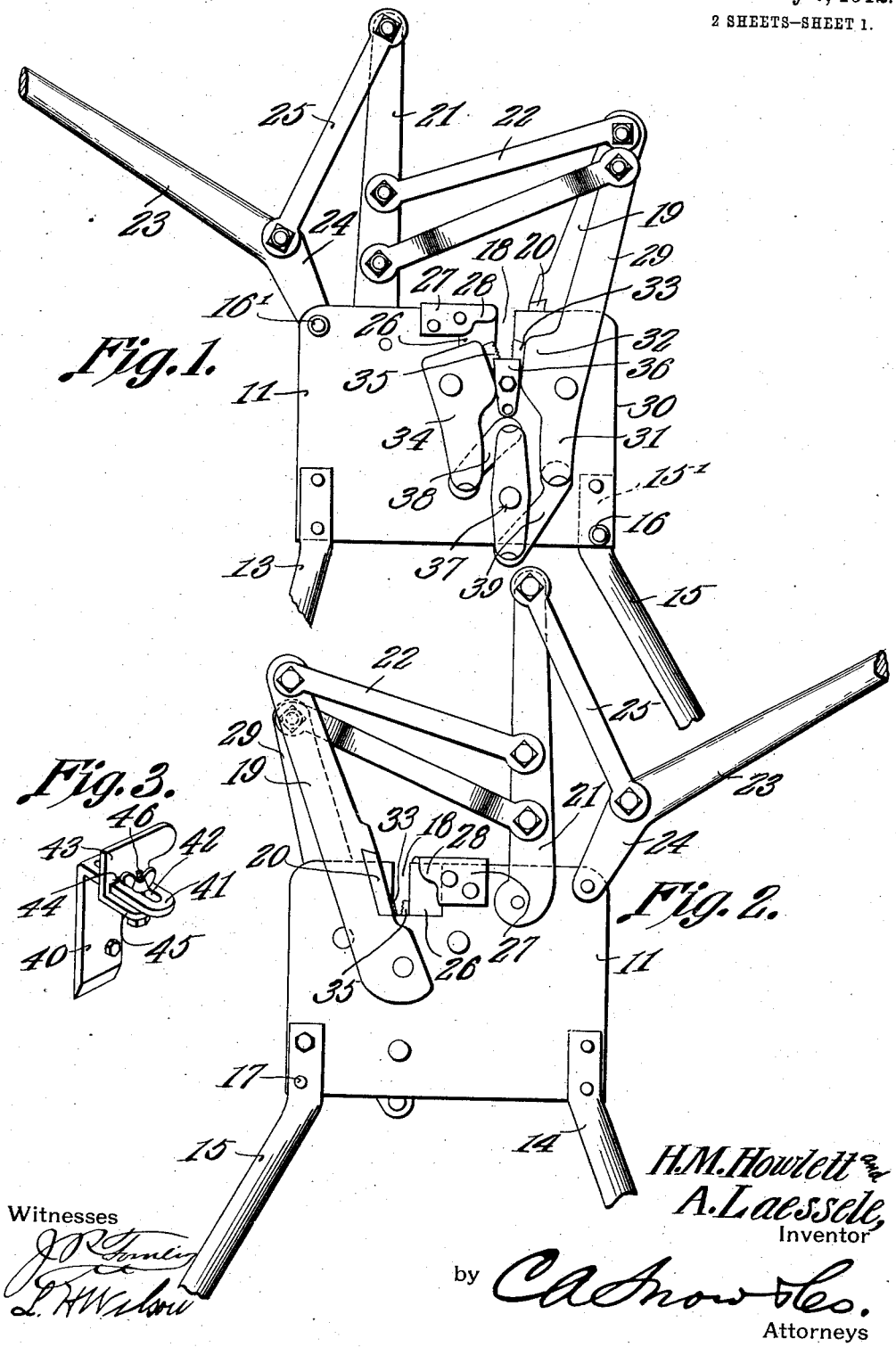

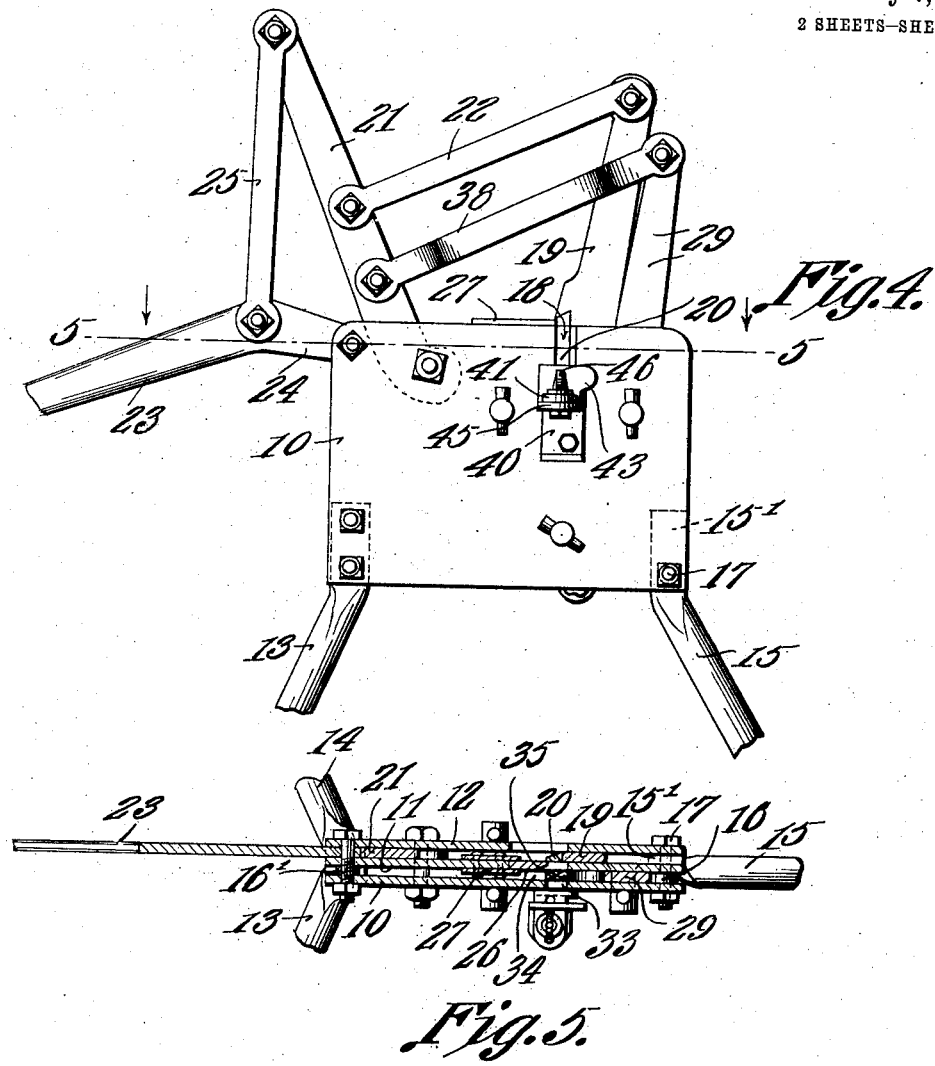

HENRY M. HOWLETT AND ALBERT LAESSELE, OF SANDUSKY, OHIO.

MACHINE FOR MAKING TOE-CALKS.

1,025,270. Specification of Letters Patent. Patented May 7, 1912.

Application filed March 31, 1911. Serial No. 618,121.

*To all whom it may concern:*

Be it known that we, HENRY M. HOWLETT and ALBERT LAESSELE, citizens of the United States, residing at Sandusky, in the county of Erie, State of Ohio, have invented a new and useful Machine for Making Toe-Calks, of which the following is a specification.

This invention relates to an improvement in machines for forming horse-shoe calks.

The primary object of the invention is to provide a machine of this character which will effectually form the calk and sever the same from the stock from which it is formed.

A further object of the invention is to provide means for forming the calk and severing the same from the stock said means to be actuated by a single movement of an operating lever.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation of the device one of the plates being removed to show the calk-forming mechanism. Fig. 2 is a side elevation, the other plate being removed to show the shearing mechanism. Fig. 3 is a detail view of the gage by means of which the length of calk may be regulated. Fig. 4 is a side elevation of the complete machine; and Fig. 5 is a section taken on the line 5—5 of Fig. 4.

In the drawings 10, 11, and 12 designate spaced supporting plates which may be supported by legs 13, 14 and 15, the leg 13 being secured between the plate 10 and the plate 11, adjacent the ends of said plates and the leg 14 being secured between the plate 11 and the plate 12, the leg 15 being secured between the plates 11 and 12, the offset end portions of the legs which are secured between the plates spacing said plates, the plates 10 and 11 adjacent the leg 15 being spaced by a suitable nut 16, said nut being held in place by the bolt 17, which extends through the extension 15′ formed integral with the leg 15, the upper ends of said plates being spaced by the nuts 16′. The plates are provided with registering apertures 18. Pivotally supported immediately below the aperture formed in the plate 12 is a lever 19 which is provided with a shearing knife 20. A second lever 21 is pivoted adjacent the top of said plate, the lever 21 being connected to the lever 19 by means of a link 22, the end portions of the link 22 and the lever 19 being connected, said link being connected centrally to the lever 21. An operating lever 23 is provided with the off-set extension 24, which is pivotally supported adjacent the upper corner of the plate, this operating lever 23 being connected to the end portion of the lever 21 by means of a link 25. Thus, it will be seen that as the operating lever 23 is forced downward, the link 25 will assume the position shown in Fig. 4, the lever 21 swinging the lever 19 on its pivot, the knife 20 shearing the material which may be placed between the walls of the registering apertures 18 of the plates.

Secured to the plate 11 is a stationary knife 26 which co-acts with the knife 20, the stationary knife being held against lateral displacement by means of the U-shaped member 27 which is bolted to the plate 11 and whose extended portions 28 contact with the knife 26. The calk forming mechanism is positioned on the other face of the plate 11. A lever 29 is pivotally supported between the plates 11 and 12 at a point adjacent the edge 30 of the plates, said lever being formed with a reduced extension 31 and at a point adjacent said extension with an enlargement 32, said enlargement receiving one of the members 33 of the calk-forming mechanism. A jaw 34 is supported directly opposite of the lower portion of the lever 29 and said jaw 34, and the lower portion of said lever forms a pair of jaws which are adapted for movement toward and away from each other, the jaw 34 being provided with a calk-forming member 35 which is similar to the member 33 carried by the lever 29. A guide 36 for said members 35 and 33 is positioned between the jaws, said guide consisting of a plate spaced from the plate 11 and extending a sufficient distance between the jaws to overlap the lower portions of the members 35 and 33 when the jaws are in their open position as shown in Fig. 1. The end portions of the jaws have a toggle connection which consists of the rotatably supported member 37, the end portions of which are connected by means of links 38 and 39 to the end portions of the jaws 34 and 29, respectively. Thus it will be seen that as the lever 29 is swung on its pivot, its enlargement 32 traveling toward the aperture 18, will impart a simultaneous movement to the jaw 34, the enlarged portion of which will travel toward said aperture. Thus the material which has been previously placed within the slot or aperture 18 will be grasped between the formers 33 and 35, these formers pressing the material into proper shape to form the article. Attention is called to the fact that these formers may be conveniently removed and replaced in order to vary the shape of the calk, the guide 36 preventing lateral movement of the formers as the jaws are brought together. The jaw 29 is connected to the lever 21 by means of a link 38, the end portions of said lever and link being pivotally connected, said link being pivotally connected to the lever 21 at a point below its center, the link having its end portion 39 off-set in order that its body portion may lie in alinement with the lever 21 and at the same time impart a proper movement to the lever 29. Thus it will be seen that as the operating lever 23 is depressed as shown in Fig. 4, the links 22 and 38 will be substantially parallel, the shearing mechanism and forming mechanism being consonantly actuated by the movement of said lever.

Attention is called to the fact that the formers will travel in advance of the shearing mechanism thus forming the calk before the same is severed, the formers normally lying in contact with the metal from which the calk is formed.

In order to regulate the length of the calk which is formed, an L-shaped bracket 40 is supported by the plate 10, the extension 41 of said plate being provided with a slot 42, said extension 41 supporting an adjustable gage 43 which is slotted at 44 to receive the extension, the gage 43 being formed with an extension 45 which lies parallel with the extension 41, a screw 46 being carried by the extension 45, the end portion of said screw being provided with a nut which contacts with the extension 41 permitting the adjustment of the gage guide 43. This guide may be adjusted in order to regulate the length of the calk to be cut, the bar of material from which the calk is formed being placed with its end portion in contact with the face of the gage guide 43.

The many advantages of a machine of this character will be clearly apparent and it will be noted that a single operation of the machine effectually forms the calk and severs the calk from the material from which the same is formed, the two mechanisms being actuated consonantly, the forming mechanism performing its function slightly in advance of the shearing mechanism.

Particular attention is called to the peculiar arrangement and positioning of the formers, the jaws which support the same being simultaneously actuated.

Attention is called to the fact that the machine is of such a construction as may be easily and economically manufactured the various parts being readily assembled.

What is claimed is:—

1. In a calk-forming machine, a pivotally supported shearing member, a pivotally supported former, a pivoted lever, said forming and said shearing members having link connections with said lever, an operating lever, and a link connection between said operating lever and said first mentioned lever.

2. In a calk-forming machine, a plurality of formers, means for simultaneously moving said formers to contact with the stock of which the calk is formed, and a shearing member having an operative connection with and operating consonant with the formers, said member being active to the stock while the same is held by said formers, said shearing members and formers being active in the same horizontal plane.

3. In a calk-forming machine, a plurality of pivotally supported formers, said formers being movable simultaneously, a shearing mechanism, an operative connection between said shearing mechanism and the formers, said formers supporting the stock while the shearing mechanism is active.

4. In a calk-forming machine, a plurality of movable formers, said formers being movable simultaneously, a shearing mechanism, an operative connection between said shearing mechanism and the formers, said formers supporting the stock while the shearing mechanism is active.

In testimony that we claim the foregoing as our own, we have hereto affixed our signatures in the presence of two witnesses.

HENRY M. HOWLETT.
ALBERT LAESSELE.

Witnesses:
ALEX. M. WAGNER,
ELMER C. MARTIN.

Copies of this patent may be obtained for five cents each, by addressing the "Commissioner of Patents, Washington, D. C."